(12) United States Patent
Mutter et al.

(10) Patent No.: US 11,665,019 B2
(45) Date of Patent: May 30, 2023

(54) APPARATUS FOR TRANSMITTING DATA OVER A BUS SYSTEM AND OPERATING METHOD FOR THAT PURPOSE (71) Applicant: Robert Bosch GmbH, Stuttgart (DE)

(72) Inventors: Arthur Mutter, Neuhausen (DE); Florian Hartwich, Reutlingen (DE); Franz Bailer, Moessingen (DE); Ramona Jung, Stuttgart (DE); Thomas Enderle, Munich (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 17/453,596

(22) Filed: Nov. 4, 2021

(65) Prior Publication Data
US 2022/0150091 A1 May 12, 2022

(30) Foreign Application Priority Data
Nov. 10, 2020 (DE) ..................... 10 2020 214 097.9

(51) Int. Cl.
H04L 12/40 (2006.01)
H04L 67/1097 (2022.01)

(52) U.S. Cl.
CPC .. *H04L 12/40169* (2013.01); *H04L 12/40013* (2013.01); *H04L 67/1097* (2013.01); *H04L 2012/40215* (2013.01); *H04L 2012/40273* (2013.01)

(58) Field of Classification Search
CPC H04L 12/40; H04L 12/40013; H04L 67/0097
See application file for complete search history.

(56) References Cited

U.S. PATENT DOCUMENTS

| | | | | |
|---|---|---|---|---|
| 2009/0210073 A1* | 8/2009 | Heller | ................. | H04L 12/4135 700/19 |
| 2016/0149934 A1* | 5/2016 | Frank | ...................... | H04L 63/10 726/23 |
| 2017/0011000 A1* | 1/2017 | Machauer | ........... | H04L 43/0847 |
| 2021/0357344 A1* | 11/2021 | Rennig | ................. | H04L 7/0008 |

* cited by examiner

*Primary Examiner* — Henry Tsai
*Assistant Examiner* — Christopher A Daley
(74) *Attorney, Agent, or Firm* — Norton Rose Fulbright US LLP; Gerard Messina (57) ABSTRACT An apparatus for transmitting data over a bus system, having a storage device for at least temporary storage of messages transmittable over the bus system. The apparatus is designed to check at least one message, stored in the storage device, for at least one criterion and to alter at least one portion of the message based on the check.

15 Claims, 5 Drawing Sheets

APPARATUS FOR TRANSMITTING DATA OVER A BUS SYSTEM AND OPERATING METHOD FOR THAT PURPOSE

FIELD

The present invention relates to an apparatus for transmitting data over a bus system.

In addition, the present invention relates to a method for transmitting data over a bus system.

SUMMARY

Exemplary embodiments of the present invention relate to an apparatus for transmitting data over a bus system, e.g., a CAN XL-bus system or CAN-, i.e., CAN FD-bus system, having a storage device for at least temporary storage of messages transmittable over the bus system, for example, the apparatus being designed to check at least one message, stored in the storage device, for at least one criterion and to alter at least one portion of the message based on the check. For example, in further exemplary embodiments, this permits at least partial altering of messages, e.g., outside of a range of action of a computer program which is designed to transmit and/or receive CAN XL messages, for instance.

For example, in further exemplary embodiments of the present invention, the apparatus takes the form of a CAN XL transceiver, e.g., a hardware circuit.

In further exemplary embodiments of the present invention, the check for the at least one criterion may include filtering based on at least one filter criterion, for example.

For instance, in further exemplary embodiments, the check for the at least one criterion may be carried out based on at least one state, e.g., based on at least one state of the apparatus or based on at least one state of a target system of the apparatus such as a control unit or a vehicle, e.g., a motor vehicle.

In other exemplary embodiments of the present invention, a filter device is provided which is designed to carry out the check and/or alteration. In additional exemplary embodiments, at least the filter device takes the form of a hardware circuit.

In further exemplary embodiments of the present invention, the storage device has a receive buffer for at least temporary storage of messages received over the bus system and/or a transmit buffer for at least temporary storage of messages to be transmitted over the bus system, the apparatus being designed, for example, to check and/or to alter at least one of the received messages and/or at least one of the messages to be transmitted.

In additional exemplary embodiments of the present invention, the check and/or alteration is thus carried out on messages which are located at least temporarily in the storage device, e.g., in the transmit buffer and/or the receive buffer.

In further exemplary embodiments of the present invention, the alteration includes adapting and/or setting at least one data field (more specifically, at least one portion of a data field) of the message, the at least one data field characterizing a payload or header of the message, for example.

In further exemplary embodiments of the present invention, the alteration is carried out based on information of at least one data field of the message. That is, the alteration may be made in a first manner or in a different manner depending on the content of the at least one data field, for example.

In further exemplary embodiments of the present invention, the alteration includes altering a priority identifier (priority ID) based on a type of payload of the message, for example. As a result, in the case of further exemplary embodiments, it is possible, as an example, that the apparatus will assign to a message having a payload of a first type a higher priority or priority ID (than has been specified, for instance, for the creation of the message, e.g., by a computer program such as an application program of a control unit which uses the apparatus as a CAN XL transceiver for transmitting and/or receiving CAN XL messages over the bus system, for instance), whereas the apparatus will assign a lower priority or priority ID to a message having a payload of a second type, for example.

In additional exemplary embodiments of the present invention, the apparatus changes a priority ID of messages dynamically (during operation) based on a content of the specific message and/or based on operating data of the apparatus, for instance.

In further exemplary embodiments of the present invention, the apparatus is designed to carry out the check and/or the alteration based on configuration data, the configuration data characterizing, e.g., at least one of the following elements: a) the at least one criterion, b) further criteria for the checking, c) information for the altering of the at least one portion of the message.

In other exemplary embodiments of the present invention, the apparatus is designed to store the configuration data in a protected memory, the protected memory being writable by a hardware security module, for example, but not, for instance, by an application program, executable on a computing device, for transmitting and/or receiving the data over the bus system with the aid of the apparatus.

In further exemplary embodiments of the present invention, the apparatus is designed to carry out the check and/or the alteration: a) one time and/or b) based on events and/or c) repeatedly, e.g., periodically.

In additional exemplary embodiments of the present invention, the apparatus is designed to erase a message from the transmit buffer when, for example, at least one criterion for the erasure is satisfied, such as when a) a predefinable maximum number of arbitration procedures (that is, transmission attempts) with respect to the message has been reached and/or when b) a predefinable waiting time has elapsed.

Additional exemplary embodiments of the present invention relate to a control unit such as for a vehicle, e.g., a motor vehicle, having at least one apparatus according to the specific embodiments.

Further exemplary embodiments of the present invention relate to a method for operating an apparatus for transmitting data over a bus system such as a CAN XL bus system, having a storage device for at least temporary storage of messages transmittable over the bus system, for example, the apparatus checking at least one message, stored in the storage device, for at least one criterion and altering at least one portion of the message based on the check.

Additional exemplary embodiments of the present invention relate to a use of the apparatus according to the specific embodiments and/or the control unit according to the specific embodiments and/or the method according to the specific embodiments for at least one of the following elements: a) Filtering of messages transmittable and/or transmitted over the bus system, b) Modifying of messages transmittable and/or transmitted over the bus system, c) Forcing a specific value for at least one data field of the message, d) Preventing manipulation of the messages by a program, e.g., application program, executable on the control unit, e) Open and/or closed-loop control of a utilization of the bus system.

Further features, possibilities of application and advantages of the present invention are derived from the following description of exemplary embodiments of the present invention, which are represented in the figures. In this context, all described or represented features, separately or in any combination, form the subject matter of the present invention, regardless of their formulation or representation in the description and/or in the figures.

DETAILED DESCRIPTION OF EXAMPLE EMBODIMENTS

Figure 1:
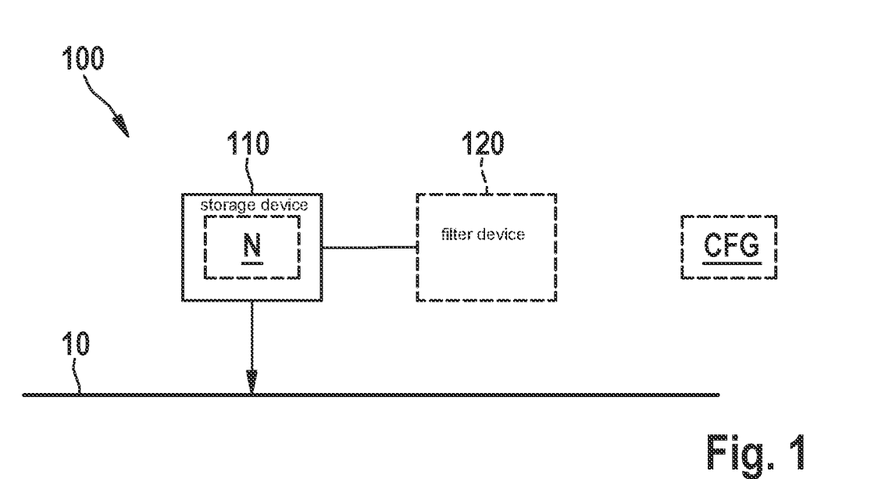
FIG. 1 shows schematically a simplified block diagram according to exemplary embodiments of the present invention.

FIG. 1 shows schematically a simplified block diagram of an apparatus 100 for transmitting data over a bus system 10 such as a CAN XL bus system 10 according to exemplary embodiments.

The apparatus has a storage device 110 for at least temporary storage of messages N transmittable over bus system 10, for example, apparatus 100 being designed (see FIG. 2A) to check 202 (e.g., to filter) at least one message N, stored in storage device 110, for at least one criterion K1 and to alter 204 at least one portion of message N based on check 202. For example, in further exemplary embodiments, this permits an at least partial alteration of messages N, e.g., outside of a range of action of a computer program (not shown in FIG. 1, see, e.g., reference mark PRG from FIG. 4), which is designed, for example, to transmit and/or receive CAN XL messages in connection with bus system 10 utilizing apparatus 100.

For instance, in further exemplary embodiments, apparatus 100 takes the form of a CAN XL transceiver, e.g., a hardware circuit.

In other exemplary embodiments, a filter device 120 (FIG. 1) is provided, which is designed to carry out check 202 (FIG. 2A) and/or alteration 204. In additional exemplary embodiments, at least filter device 120 takes the form of a hardware circuit.

Figure 2A:
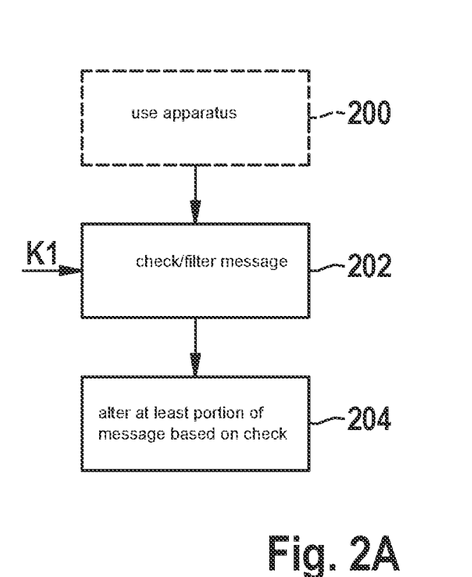
FIG. 2A shows schematically a simplified flowchart of a method according to further exemplary embodiments of the present invention.
Figure 3:
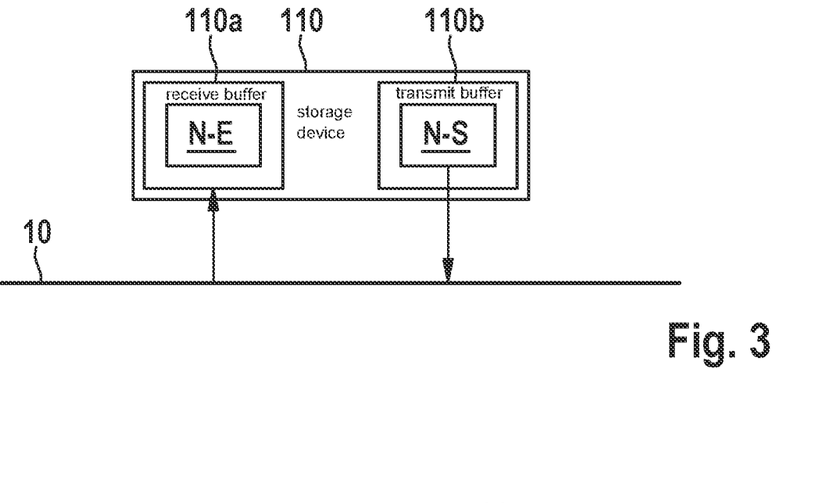
FIG. 3 shows schematically a simplified block diagram according to further exemplary embodiments of the present invention.

In further exemplary embodiments, FIG. 3, storage device 110 has a receive buffer 110a for at least temporary storage of messages N-E received over bus system 10 and/or a transmit buffer 110b for at least temporary storage of messages N-S to be transmitted over bus system 10, apparatus 100 (FIG. 1) being designed, for example, to check 202 (FIG. 2A) and/or to alter 204 at least one of received messages N-E and/or at least one of messages N-S to be transmitted.

In other exemplary embodiments, check 202 and/or alteration 204 is/are thus carried out on messages N, N-E, N-S which are located at least temporarily in storage device 110, e.g., in transmit buffer 110b and/or receive buffer 110a.

In additional exemplary embodiments, alteration 204 (FIG. 2A) includes adapting and/or setting at least one data field (that is, at least one portion of a data field) of message N, the at least one data field characterizing a payload or header of the message, for example.

Figure 5:
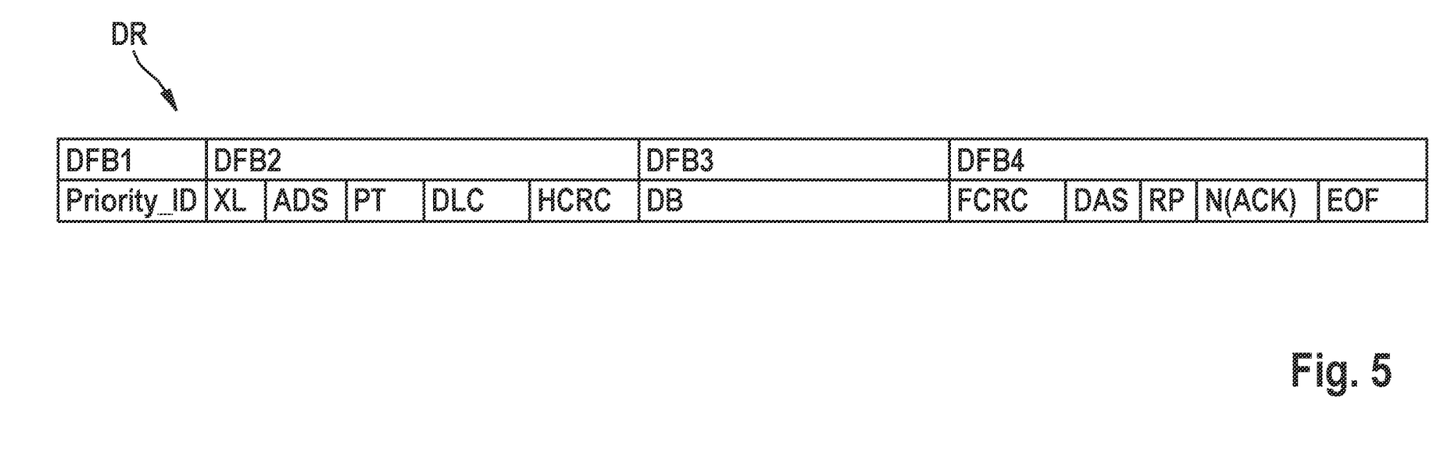
FIG. 5 shows schematically a data frame according to further exemplary embodiments of the present invention.

By way of example, FIG. 5 shows a frame format of a data frame DR of a message N (FIG. 1) according to further exemplary embodiments. Data frame DR has a plurality of data-field sections DFB1, DFB2, DFB3, DFB4, data-field sections DFB1, DFB2 being associated with a header, for example, data-field section DFB3 being associated with a payload, for example, and data-field section DFB4 ("trailer") being associated with control data, for example.

In other exemplary embodiments, data frame DR has one or more of the following data fields or data-field contents:

Priority_ID: Identifier, e.g., for an arbitration, usable for regulating prioritization for the bus access, XL: Data field which characterizes a data-frame format, e.g., whether it is a CAN FD data frame or a CAN XL data frame, ADS: Arbitration Data Switch, e.g., for switching the bit rate from arbitration phase to data phase, PT: Payload Type, characterizes a type of the payload DB, DLC: Data Length Code, HCRC: Header CRC, checksum, e.g., to secure the header, DB: Payload, e.g., 1 to 2048 bytes, FCRC: Frame CRC, checksum, e.g., to secure payload DB, DAS: Data Arbitration Switch, e.g., for switching the bit rate from data phase to arbitration phase, RP: Re-integration Pattern, e.g., for bus users which have or have determined an invalid header checksum HCRC, ACK/NACK: Positive/negative acknowledgment (confirmation) bits, EOF: End Of Frame, e.g., to indicate the end of data frame DR.

In further exemplary embodiments, FIG. 2A, alteration 204 is carried out based on information of at least one data field of message N, that is, of data frame DR (FIG. 5) corresponding to message N. That is to say, alteration 204, i.e., the setting of the data field in question to a first value or to a second value which is different from the first value, may be carried out in a first manner or in a different manner, depending on the content of the at least one data field, for example.

In additional exemplary embodiments, alteration 204 (FIG. 2A) includes altering a priority identifier Priority_ID (FIG. 5) based on a type PT of payload DB of message N, DR, for example. As a result, in the case of other exemplary embodiments, it is possible, for example, that apparatus 100 (FIG. 1) will assign to a message N having a payload of a first type a higher priority or Priority_ID (than has been specified, for example, for the creation of message N, e.g., by a computer program PRG (FIG. 4) such as an application program of a control unit 20, which uses apparatus 100 as a CAN XL transceiver for transmitting and/or receiving CAN XL messages over bus system 10, for example), whereas apparatus 100 will assign a lower priority or Priority_ID to a message having a payload of a second type, for instance.

In further exemplary embodiments, apparatus 100 alters a priority ID of messages dynamically (during operation) based on a content of the specific message and/or based on operating data of apparatus 100, for example.

In other exemplary embodiments, apparatus 100 determines a checksum (e.g., for CRC) of an outgoing message (corresponding, e.g., to criterion K1) dynamically (during operation) and writes it into message N (block 204 according to FIG. 2A).

In additional exemplary embodiments, apparatus 100 is designed to carry out check 202 and/or alteration 204 based on configuration data CFG (FIG. 1), configuration data CFG characterizing, e.g., at least one of the following elements: a) the at least one criterion K1, b) further criteria for check 202, c) information for alteration 204 of the at least one portion of the message.

Figure 4:
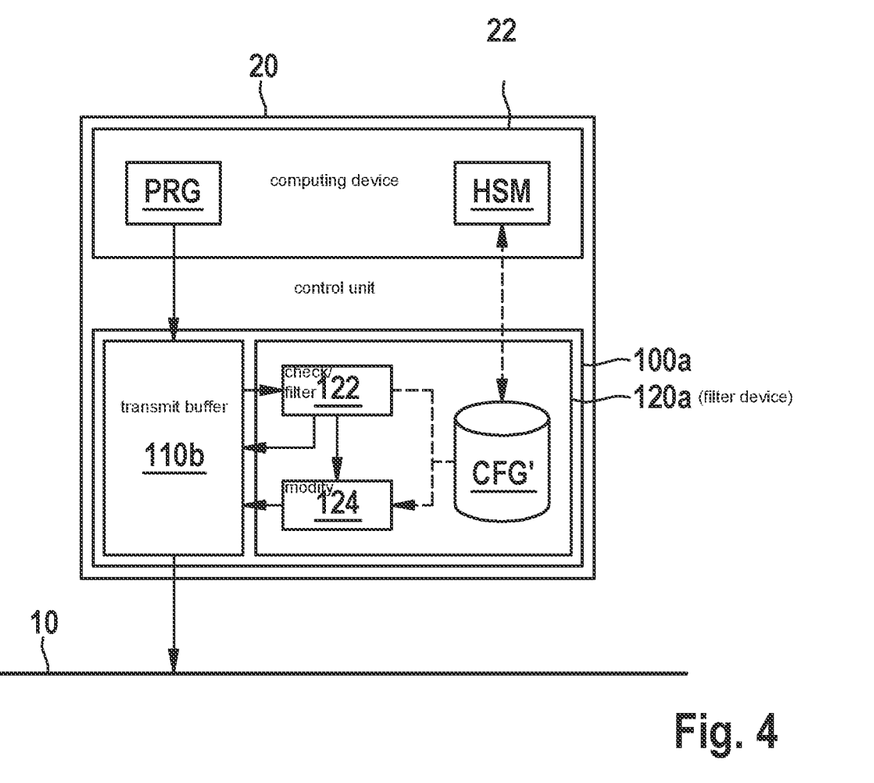
FIG. 4 shows schematically a simplified block diagram according to further exemplary embodiments of the present invention.

In other exemplary embodiments, (see optional step 200 from FIG. 2A), apparatus 100 receives at least a portion of configuration data CFG from another unit, e.g., a control unit 20 (see FIG. 4).

FIG. 4 shows schematically a simplified block diagram according to further exemplary embodiments. An apparatus 100a is shown which, for example, is designed in a manner comparable to apparatus 100 according to FIG. 1 for carrying out the method according to the specific embodiments described above by way of example with reference to FIG. 2A. As an example, FIG. 4 shows a receive buffer 110b of apparatus 100a and a filter device 120a which is formed comparably, e.g., to filter device 120 according to FIG. 1 and is designed to carry out the method according to FIG. 2A, for instance. Block 122 from FIG. 4 symbolizes check 202 according to FIG. 2A with the aid of filtering, for example, and block 124 according to FIG. 4 symbolizes a modification of portions of a message according to step 204 from FIG. 2A.

Figure 2B:
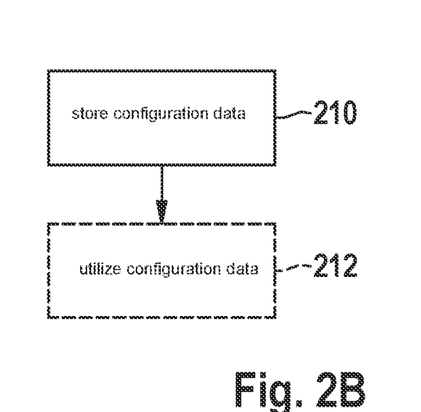
FIG. 2B shows schematically a simplified flowchart of a method according to further exemplary embodiments of the present invention.

In further exemplary embodiments (FIG. 4, 2B), filter device 120a has a protected memory CFG', and apparatus 100a is designed to store configuration data CFG (FIG. 1) in protected memory CFG' (compare step 210 according to FIG. 2B) and optionally, to utilize configuration data CFG stored in this manner (compare step 212). For example, whereas protected memory CFG' is writable by a hardware security module HSM of a control unit 20, into which apparatus 100a is also integrated in the present case, for instance. As an example, protected memory CFG' is not writable, however, by an application program PRG that is executable on a computing device 22 of control unit 20 and is usable to transmit and/or receive data over bus system 10 with the aid of apparatus 100a, for example.

In further exemplary embodiments, it may thus be ensured that a possibly compromised software PRG is not able to manipulate protected memory CFG' of apparatus 100a. As a consequence, even if software PRG or control unit 20 is compromised, apparatus 100a is still able to carry out its check 202 and possible alteration 204 (FIG. 2A) of messages, in order to alter or to overwrite or to set to a neutral value possibly harmful information, for example, which is written by software PRG into messages to be transmitted.

In further exemplary embodiments, this mechanism may also be used to the effect that, for example, with the aid of check 202, apparatus 100a determines whether harmful information is contained in a data frame DR (FIG. 5) to be transmitted, for instance. In this case, apparatus 100a may infer, for example, that software PRG, under whose control data frame DR to be transmitted has been generated, for instance, is possibly compromised. In step 204, for example, apparatus 100a may then write at least one piece of warning information into data frame DR to be transmitted, which signals to a receiver that apparatus 100a has detected a manipulation attempt. Since the warning information is written in step 204 by apparatus 120a or 100a implemented, e.g., as a hardware circuit—and is written after a point in time when data frame DR is generated by software PRG—namely, in buffer memory 110b of apparatus 100a, for example, apparatus 100a, 120a is able to introduce the warning into data frame DR independently and, in particular, in a manner unable to be influenced by the possibly compromised software PRG, thereby further increasing security.

In additional exemplary embodiments, configuration data CFG may have a list of several filter criteria ("filter list"), for example, based on which the message(s) may be checked or filtered in order, for instance, to select the message(s) for a possible alteration 204, e.g., if at least one of the several filter criteria applies. For example, since the filter list is in memory CFG' which is protected from access by software PRG, in other exemplary embodiments, the software is not able to alter filter list CFG. For instance, in the case of additional exemplary embodiments, filter list CFG can only be written into protected memory CFG' by hardware security module HSM for use by filter device 120a, for example.

In further exemplary embodiments, apparatus 100, 100a is designed to carry out check 202 and/or alteration 204: a) one time and/or b) based on events and/or c) repeatedly, e.g., periodically.

In the event steps 202 and/or 204 is/are carried out one time, according to additional exemplary embodiments, alteration 204, e.g., in the sense of a modifying filtering (filtering, e.g., with the aid of step 202, modifying, e.g., with the aid of step 204), is applied one time to an incoming or outgoing message, for instance. In this context, for example, frame-modifying filter may be implemented directly between CAN (XL-) bus 10 (Rx) and Rx buffer (receive buffer) 110a (FIG. 3), or between software (Tx) PRG (see below, FIG. 4) and Tx buffer (transmit buffer) 110b.

In the event steps 202 and/or 204 is/are carried out repeatedly, e.g., periodically, according to other exemplary embodiments, alteration 204, e.g., in the sense of a modifying filtering, is applied regularly to Tx/Rx buffer 110a, 110b, for instance. In that case, for example, apparatus 100 or 120a checks messages one after another in transmit buffer 110b, e.g., in the sense of block 202 according to FIG. 2A. In the event of an accordance, as an example, one field of the message is adapted, otherwise left as is, for example. According to further exemplary embodiments, for instance, the cyclical implementation permits dynamic filtering and revision of messages, for example.

In further exemplary embodiments, apparatus 100, 100a is designed to erase a message from transmit buffer 110b when, for example, at least one criterion for the erasure is satisfied, such as when: a) a predefinable maximum number of arbitration procedures (that is, transmit attempts) with respect to the message has been reached (this corresponds, e.g., to a message with "expiry date," which is a function, for example, of the usage of bus 10 by other nodes, for instance) and/or when b) a predefinable waiting time (e.g., 100 milliseconds) has elapsed (this corresponds to a message with absolute "expiry date," for instance).

Additional exemplary embodiments relate to a control unit 20 (FIG. 4) such as for a vehicle, e.g., a motor vehicle, having at least one apparatus 100a according to the specific embodiments.

Further exemplary embodiments, FIG. 2A, relate to a method for operating an apparatus 100, 100a to transmit data over a bus system 10 such as a CAN XL bus system, having a storage device 110 for at least temporary storage of messages N transmittable over bus system 10, for example, apparatus 100, 100a checking 202 at least one message N, stored in storage device 110, for at least one criterion K1 and altering 204 at least one portion of message N based on check 202.

Figure 6:
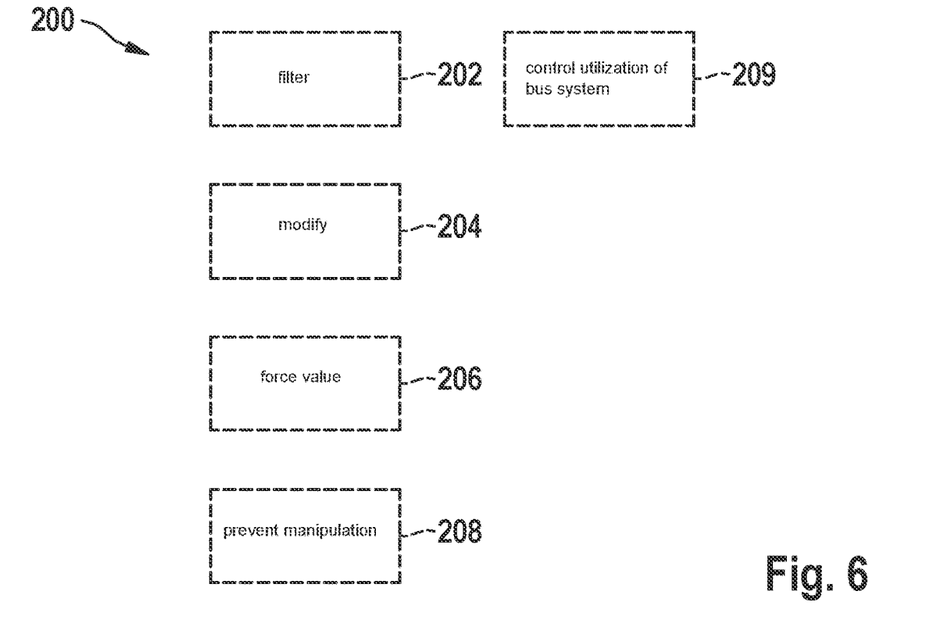
FIG. 6 shows schematically aspects of utilizations according to further exemplary embodiments of the present invention.

Additional exemplary embodiments, FIG. 6, relate to a use 200 of apparatus 100, 100a according to the specific embodiments and/or control unit 20 according to the specific embodiments and/or the method according to the specific embodiments for at least one of the following elements: a) Filtering 202 of messages N transmittable and/or transmitted over bus system 10, b) Modifying 204 of messages N transmittable and/or transmitted over bus system 10, c) Forcing 206 a specific value for at least one data field of message N, d) Preventing 208 manipulation of messages N by a program PRG, e.g., application program, executable on control unit 20, e) Open and/or closed-loop control 209 of a utilization of bus system 10.

In the following, further advantageous aspects and specific embodiments are described, which in each case individually or in combination with each other, are able to be combined with at least one of the specific embodiments described above by way of example.

In the case of additional exemplary embodiments, the principle according to the specific embodiments may be used to assign a virtual CAN bus identification (VCAN ID), i.e., a VCAN identifier to at least one message N. With the aid of the VCAN ID, the message traffic of bus system 10 may be separated into a plurality of logical networks, for example, each of which has a different VCAN ID.

For example, in other exemplary embodiments, data frame DR shown by way of example in FIG. 5 may also have a data field with a VCAN ID, which is not shown in the present case for reasons of clarity.

In additional exemplary embodiments, there are various possibilities for transmitting the VCAN ID in CAN (XL-) data frame DR (FIG. 5): a) for example, the VCAN ID may be coded in the lowest-order 4 bits of the frame identifier Priority_ID, b) for example, the VCAN ID may be coded in a VCAN ID field provided explicitly for that purpose. In additional exemplary embodiments, this field may be placed in the header of data frame DR, for example, or after the header.

In further exemplary embodiments, messages for a diagnostic communication over bus system 10 are identified by a specific value in the payload type (PT, see FIG. 5).

In other exemplary embodiments, apparatus 100, 100a, or rather its filter device 120, 120a, is configured in such a way that it (e.g., in block 202, FIG. 2A) detects this payload type (e.g., "diagnostic communication") and in the case of messages N in question, sets the value of the VCAN ID to a value which is assigned to a VCAN provided for the diagnostic, for example.

In additional exemplary embodiments, messages with a different payload (that is, payload type) are assigned to a different VCAN.

In further exemplary embodiments, software PRG (FIG. 4) does not need to attend to a correct VCAN ID; optionally, software PRG must not attend to it at all, so as not to be able to transmit any manipulated messages, for example. Consequently, the possibility of an attacker which wants to assume control over a target system of bus system 10, e.g., a vehicle, through manipulated messages is reduced.

In other exemplary embodiments, the principle according to the embodiments may be used for assigning the priority of a message, for instance.

For example, CAN XL uses the priority ID for the arbitration of messages (see reference mark Priority_ID from FIG. 5). In that case, for instance, at least one specific priority ID is assigned to several, e.g., all, bus users (not shown) in a CAN (XL) network in order to classify the priority of messages. The lower the priority ID, the more important the message: A message having priority ID 1 has a higher priority than a message with priority ID 2. Preferably, messages are handled, e.g., placed earlier or later on the CAN bus (when sending, Tx) depending on priority In a further exemplary embodiment, FIG. 7, apparatus 100, 100a has an optional Tx Message Handler TX_MH, thus, a device for processing messages to be transmitted, which, for example, is able to use a first filter list ("Tx Filter List") FL-1 that is stored, for instance, in an optional main-memory RAM in the form of individual "TX Filter Elements" TXFE-1, TXFE-2, . . . , for example.

In additional exemplary embodiments, a TX Filter Element TXFE-1 characterizes a data structure, e.g., in the main-memory RAM, which determines how an individual filter is configured, thus, e.g., which fields of data frame DR (FIG. 5) are compared (for example, according to block 202 from FIG. 2A), for instance, to which reference value, etc.

Figure 7:
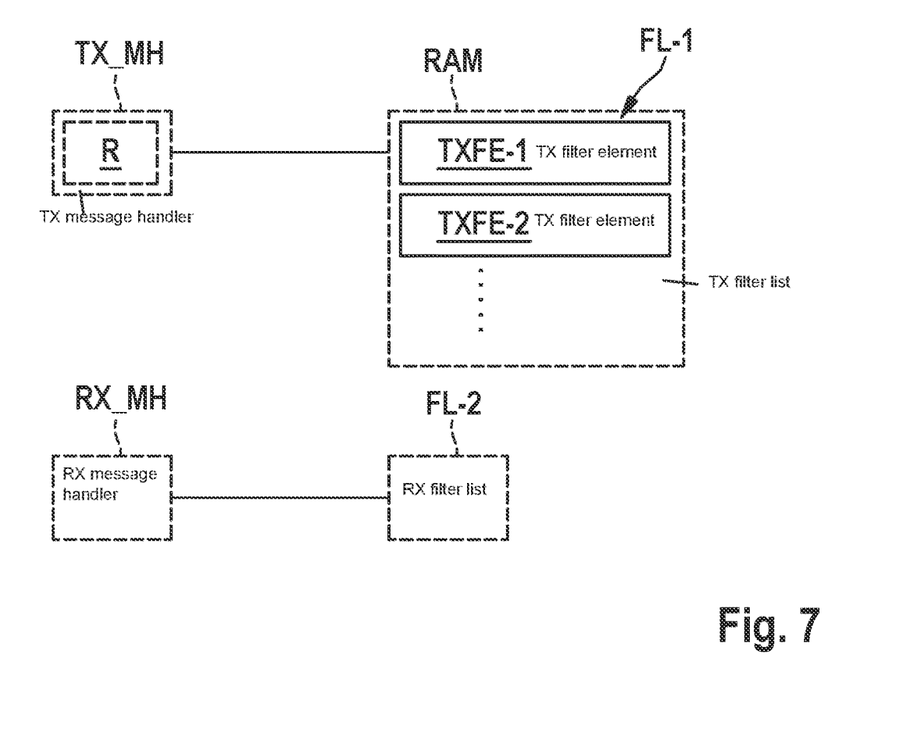
FIG. 7 shows schematically a block diagram according to further exemplary embodiments of the present invention.

In other exemplary embodiments, the number of TX Filter Elements TXFE-1, TXFE-2, . . . may be configured in a memory, e.g., a register R, of Tx Message Handler TX_MH.

Analogous to optional Tx Message Handler TX_MH, in further exemplary embodiments, an optional Rx Message Handler RX_MH, thus, a device for processing messages received or to be received, may also be provided, which, for example, is able to use a second filter list ("Rx Filter List") FL-2, comparable to the usage of first filter list FL-1 by Tx Message Handler TX_MH, for instance.

For example, in additional exemplary embodiments, for each message, the (Tx and/or Rx) Message Handler checks, e.g., the Payload Type field and/or other fields on the basis of the respective filter list. In further exemplary embodiments, the filter logic (e.g., implemented by filter device 120a) decides which priority ID is used for the message in question, depending on the value of the field.

In other exemplary embodiments, each bus user or node has a certain number of priority IDs which the respective node uses: For example, in the case of three priority IDs, a node could have (i) one high-priority ID, (ii) one medium-priority ID and (iii) one low-priority ID. With the aid of frame-modifying filtering, in further exemplary embodiments, each data frame is assigned a priority ID, e.g., according to blocks 202, 204 from FIG. 2A: For instance, when copying the message into the transmit queue (located, e.g., in transmit buffer 110b), first a priority ID is assigned to the data frame with the aid of filter device 120a, for example. In the case of other exemplary embodiments, this may be carried out, for example, on the basis of the value in the Payload Type field: For instance, PT=5 identifies low-priority diagnostic messages, while PT=3 identifies high-priority CAN messages.

In further exemplary embodiments, for example, in an implementation variant with a "cyclical execution", filter device 120, 120a (in the case of other exemplary embodiments also denotable as "frame-modifying filter") may have different functions which, in additional exemplary embodiments, may be specified, e.g., via configuration possibilities (such as flags, which may be part of configuration data CFG (FIG. 1), for instance) in one respective filter element and which, for example, allow a dynamic evaluation, e.g., "Dynamic Priority." In the dynamic priority feature in further exemplary embodiments, frame-modifying filter 120, 120a checks, for example, whether a message has lost an arbitration more frequently than a predetermined number, that is, how long has this message been dwelling in the transmit queue. If the message has already been too long in the transmit queue, the priority of the message is raised or lowered. In the case of additional exemplary embodiments, for example, it is thereby possible to classify important messages with a higher priority and transmit them sooner and/or to set a lower priority for unimportant messages when the utilization of the bus is too high at the present moment, so that utilization of bus system 10 (FIG. 1) is able to be controlled in open and/or closed loop, for example.

Figure 8:
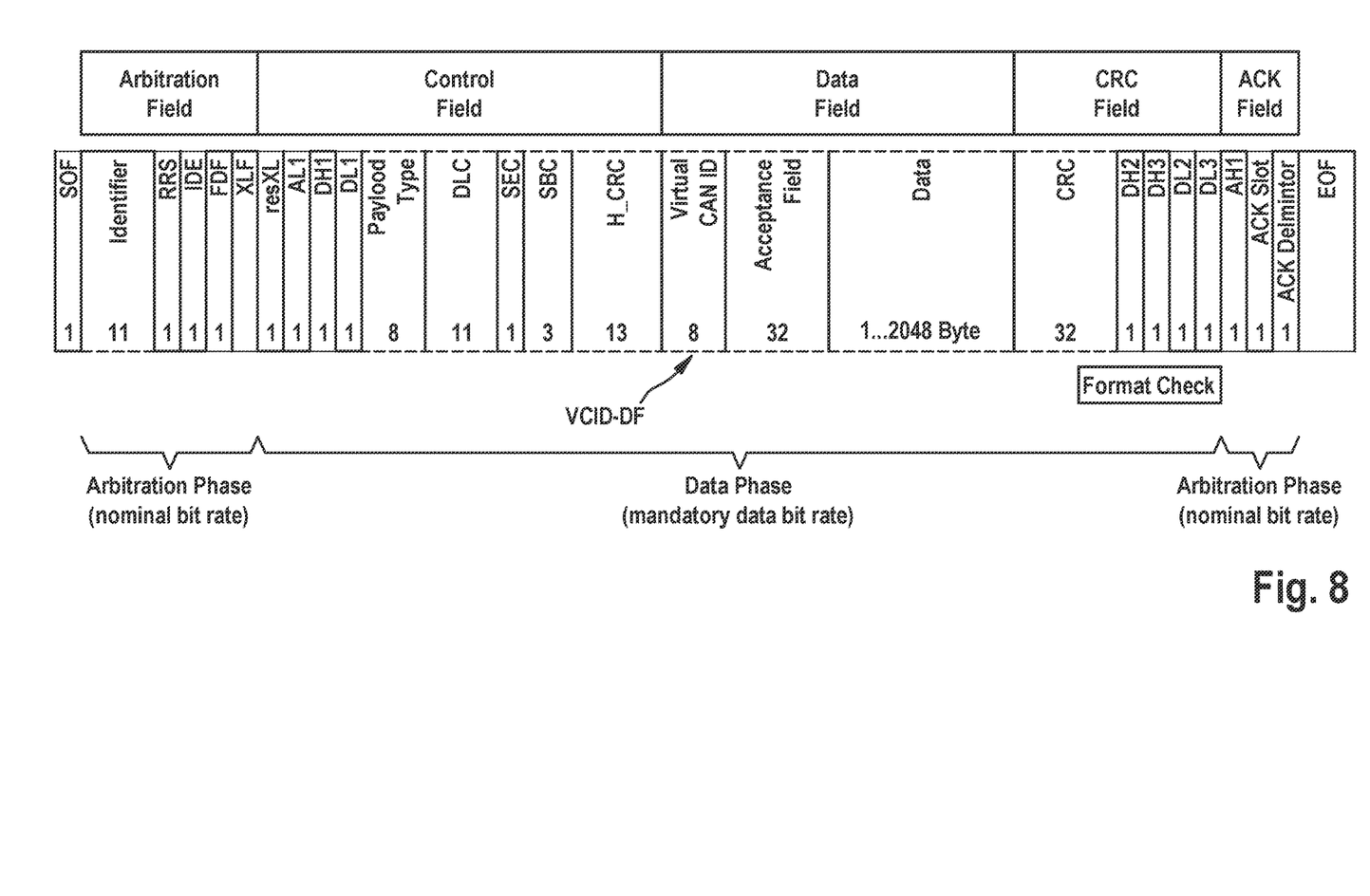
FIG. 8 shows schematically a data frame according to further exemplary embodiments of the present invention.

FIG. 8 shows schematically a data frame according to further exemplary embodiments. In further exemplary embodiments, a VCAN ID may be included in the data frame according to FIG. 8, in the present case, in data field VCID-DF, for example.

What is claimed is:

1. An apparatus for transmitting data over a bus system, comprising:
    a storage device configured to at least temporary store messages transmittable over the bus system;
    wherein the apparatus is configured to check at least one message, stored in the storage device, for at least one criterion, and to alter at least one portion of the message based on the check;
    wherein the alteration includes alteration of a priority identifier in the message based on a type of payload of the message, including altering the priority identifier so as to assign a higher priority to the message based on the message having a first type of payload, and altering the priority identifier so as to assign a lower priority to the message based on the message having a second type of payload.

2. The apparatus as recited in claim 1, wherein the bus system is a CAN XL bus system.

3. The apparatus as recited in claim 1, further comprising:
    a filter device configured to carry out the check and/or the alteration.

4. The apparatus as recited in claim 1, wherein the storage device has a receive buffer for at least temporary storage of messages received over the bus system and/or a transmit buffer for at least temporary storage of messages to be transmitted over the bus system, and wherein the apparatus is configured to check and/or to alter at least one of the received messages and/or at least one of the messages to be transmitted.

5. The apparatus as recited in claim 1, wherein the alteration includes adapting and or setting at least one data field of the message, the at least one data field characterizing a payload or header of the message.

6. The apparatus as recited in claim 1, wherein the alteration is carried out based on information of at least one data field of the message.

7. The apparatus as recited in claim 1, wherein the apparatus is configured to carry out the check and/or the alteration based on configuration data, the configuration data characterizing at least one of the following elements: a) the at least one criterion, b) further criteria for the check, c) information for the alteration of the at least one portion of the message.

8. The apparatus as recited in claim 7, wherein the apparatus is configured to store the configuration data in a protected memory, the protected memory being writable by a hardware security module, but not by an application program executable on a computing device for transmitting and/or receiving the data over the bus system using the apparatus.

9. The apparatus as recited in claim 1, wherein the apparatus is configured to carry out the check and/or the alteration a) one time and/or b) based on events and/or c) repeatedly periodically.

10. The apparatus as recited in claim 1, wherein the apparatus is configured to erase a message from the transmit buffer when at least one criterion for the erasure is satisfied, including when: a) a predefinable maximum number of arbitration procedures with respect to the message has been reached and/or when b) a predefinable waiting time has elapsed.

11. The apparatus as recited in claim 1, wherein the message is placed earlier or later on the bus, relative to other messages, depending on a priority of the message.

12. The apparatus as recited in claim 1, wherein the priority identifier is used for message arbitration.

13. A control unit for a motor vehicle, comprising:
    an apparatus for transmitting data over a bus system, including:
        a storage device configured to at least temporary store messages transmittable over the bus system;
    wherein the apparatus is configured to check at least one message, stored in the storage device, for at least one criterion, and to alter at least one portion of the message based on the check;
    wherein the alteration includes alteration of a priority identifier in the message based on a type of payload of the message, including altering the priority identifier so as to assign a higher priority to the message based on the message having a first type of payload, and altering the priority identifier so as to assign a lower priority to the message based on the message having a second type of payload.

14. A method for operating an apparatus for transmitting data over a bus system, the apparatus having a storage device for at least temporary storage of messages transmittable over the bus system, the method comprising the following steps:
    checking, by the apparatus, at least one message, stored in the storage device, for at least one criterion; and
    altering, by the apparatus, at least one portion of the message based on the check;
    wherein the altering includes alteration of a priority identifier in the message based on a type of payload of the message, including altering the priority identifier so as to assign a higher priority to the message based on the message having a first type of payload, and altering the priority identifier so as to assign a lower priority to the message based on the message having a second type of payload.

15. A method, comprising:
    providing an apparatus for transmitting data over a bus system, the apparatus including a storage device configured to at least temporary store messages transmittable over the bus system, wherein the apparatus is configured to check at least one message, stored in the storage device, for at least one criterion, and to alter at least one portion of the message based on the check, wherein the alteration includes alteration of a priority identifier in the message based on a type of payload of the message, including altering the priority identifier so as to assign a higher priority to the message based on the message having a first type of payload, and altering the priority identifier so as to assign a lower priority to the message based on the message having a second type of payload; and using the apparatus for at least one of: a) filtering of the messages transmittable and/or transmitted over the bus system, b) modifying of the messages transmittable and/or transmitted over the bus system, c) forcing a specific value for at least one data field of the message, d) preventing manipulation of messages by a program executable on an control unit, e) open and/or closed-loop controlling of a utilization of the bus system.

* * * * *